June 12, 1923.

S. P. LYON

AIRCRAFT LANDING GEAR CORD CLAMP

Filed Jan. 11, 1922

1,458,212

Inventor
S. P. Lyon
By Robert H. Young
Attorney

Patented June 12, 1923.

1,458,212

UNITED STATES PATENT OFFICE.

SIDNEY P. LYON, OF DAYTON, OHIO.

AIRCRAFT LANDING-GEAR-CORD CLAMP.

Application filed January 11, 1922. Serial No. 528,516.

*To all whom it may concern:*

Be it known that I, SIDNEY P. LYON, a citizen of the United States, residing at Dayton, in the county of Montgomery and State of Ohio, have invented certain new and useful Improvements in Aircraft Landing-Gear-Cord Clamps, of which the following is a specification.

This invention relates to aircraft landing gear cord clamps. The main object in view is to produce a simple, inexpensive and light weight clamp which will securely hold and lock together two opposing portions, such as the two ends of a landing gear cord, and enable such portions or ends to be held by a part of the cord plate or its equivalent of the landing gear thereby maintaining the cord, which is elastic, under tension.

With the above and other objects in view the invention is more fully described in the following specification in connection with the accompanying drawing.

The aircraft landing gear cord clamp comprises two members only, a wedging block 1 and a ferrule or sleeve 2. The block 1 is somewhat wedge-shaped as shown and is formed in opposite faces thereof with concaved or gutter like seats 3 designed to receive oppositely lying portions 4 of the landing cord used as the shock-absorbing elastic element of aircraft landing gear. The wedging faces of the block are longitudinally convex, as shown. The block 1 is composed of some light weight tough material such as aluminum and is shown cut away at 5 to reduce weight.

Figure 1:
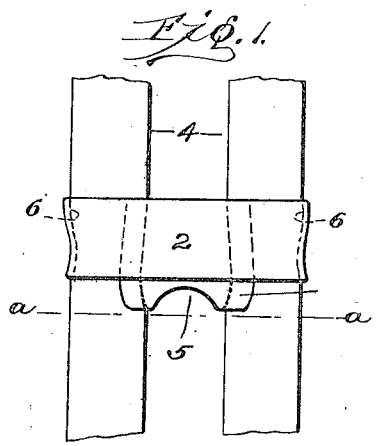
Figure 1 is a side elevation of the clamp applied.
Figure 2:
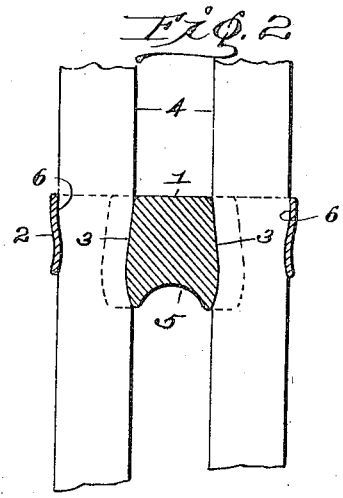
Figure 2 is a longitudinal section of the same.
Figure 3:
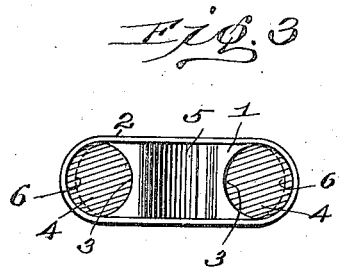
Figure 3 is a section on the line a—a of Fig. 1.
Figure 4:
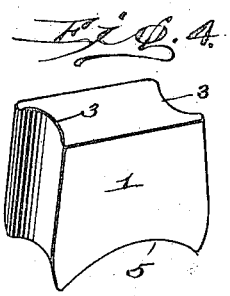
Figure 4 is a perspective view of the block member of the clamp.

The ferrule or sleeve 2 is of elongated formation and of proper dimensions to embrace both portions 4 of the cord and tightly compress and firmly clamp the same against the block 1 when subjected to the usual linear pulling strain, as indicated in Figs. 1 and 2. The cord clamping end portions of the band or ferrule 2 are rounded or substantially semi-circular as shown so as to form transversely concave wedging faces which will not chafe or injure the cord and for the same reason the inner face 6 of said ferrule is rounded or made convex as shown so that the edges thereof will not chafe the cord. Furthermore said inner face 6 is made contracting or of less dimension toward the larger portion of the block 1 in order to cooperate with the block in a joint wedging action on the portions 4 of the cord.

In applying the clamp, the two loose ends of the landing cord are reeved through the ferrule or band 2. The cord is then subjected to the tension of the winding load. Then the block 1 is placed on the cord plate, or its equivalent, of the landing gear and between the opposite end portions of the cord. The ferrule 2 is then pressed firmly over and around the cord end portions and wedging block. Then the winding tension on the end portions of the cord is relaxed and they are compressed and held securely clamped between the block 1 and the ferrule 2. The greater the load on the cord ends the tighter will be the clamping action. The surplus cord of the end portions is then cut off. It will be observed that the portions 4 of the cord are subjected to linear tension in opposite directions, said portions 4 being the end portions of the same cord. The block 1 and the ferrule 2 give the requisite wedging action in both directions and hold the cord ends firmly.

I claim:

A landing gear cord clamp for aircraft, comprising a wedging block insertable between opposing portions of the landing gear cord, and having transversely concave and longitudinally convex wedging faces, and a ferrule adapted to embrace such portions of the cord and clamp the same against said block, said ferrule having transversely concave and longitudinally convex wedging faces.

In testimony whereof I affix my signature.

SIDNEY P. LYON.